United States Patent
Gao et al.

(10) Patent No.: US 10,587,145 B2
(45) Date of Patent: Mar. 10, 2020

(54) CHARGING CIRCUIT AND ELECTRONIC DEVICE

(71) Applicant: FUJITSU LIMITED, Kawasaki-shi, Kanagawa (JP)

(72) Inventors: Hong Gao, Inagi (JP); Hiroyuki Nakamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 482 days.

(21) Appl. No.: 15/462,302

(22) Filed: Mar. 17, 2017

(65) Prior Publication Data
US 2017/0279297 A1  Sep. 28, 2017

(30) Foreign Application Priority Data

Mar. 28, 2016  (JP) ................. 2016-063429

(51) Int. Cl.
*H02J 7/00* (2006.01)
*H02J 7/35* (2006.01)

(52) U.S. Cl.
CPC .............. *H02J 7/35* (2013.01); *H02J 7/0068* (2013.01); *Y02E 10/566* (2013.01)

(58) Field of Classification Search
CPC ............. H02J 7/355; H02J 7/0068; H02J 7/35
USPC ........................................................ 320/101
See application file for complete search history.

(56) References Cited

U.S. PATENT DOCUMENTS 6,301,198 B1   10/2001  Otaka et al.
2012/0326512 A1*  12/2012  Yokoyama ................ G05F 1/67
                                                                    307/62
2014/0176043 A1*  6/2014  Fujiyama .............. H02J 7/0052
                                                                   320/101
2016/0276836 A1*  9/2016  Tanaka .................... H02J 7/345

FOREIGN PATENT DOCUMENTS

| JP | 61-251423 A | 11/1986 |
| JP | 04-265639 A | 9/1992 |
| JP | 09-261661 A | 10/1997 |
| JP | 2000-347753 A | 12/2000 |
| JP | 3271992 B2 | 4/2002 |
| JP | 2010-200397 A | 9/2010 |
| JP | 2013-257811 A | 12/2013 |
| WO | WO 99/30212 A1 | 6/1999 |

OTHER PUBLICATIONS

Japanese Office Action, Notice of Reasons for Refusal corresponding to Japanese Patent Application No. 2016-063429 dated Sep. 17, 2019.

* cited by examiner

*Primary Examiner* — Nathaniel R Pelton
(74) *Attorney, Agent, or Firm* — Arent Fox LLP

(57) ABSTRACT

A charging circuit includes a first energy harvesting element that performs energy harvesting and supplies a current to a power storage element, a second energy harvesting element that performs energy harvesting, the second energy harvesting element is made in materials same as the first energy harvesting element, and a first switch that is disposed in a current path between the first energy harvesting element and the power storage element and that is put into an off-state, in a case where a first output voltage of the second energy harvesting element is smaller than a first value, thereby cutting off the current path.

8 Claims, 12 Drawing Sheets

CHARGING CIRCUIT AND ELECTRONIC DEVICE

CROSS-REFERENCE TO RELATED APPLICATION

This application is based upon and claims the benefit of priority of the prior Japanese Patent Application No. 2016-063429, filed on Mar. 28, 2016, the entire contents of which are incorporated herein by reference.

FIELD

The embodiments discussed herein are related to a charging circuit and an electronic device.

BACKGROUND

It is proposed that energy harvesting is utilized in a sensing terminal (a terminal in which a wireless module and a sensor are combined) that has attracted rising attention in recent years, and so forth.

Electric power generated by an energy harvesting element (for example, a photovoltaic cell or the like) is stored in a power storage element such as a secondary battery in order to supply stable electric power to a load circuit of a sensing terminal. However, if environmental energy becomes weak, there is a possibility that an output voltage of the energy-harvesting element becomes lower than a voltage of the power storage element and a reverse current, headed from the power storage element to the energy-harvesting element, occurs, thereby consuming electric power.

In the past, in order to prevent such a reverse current from occurring, there has been a technology for periodically comparing a voltage generated by a photovoltaic cell and a voltage of a secondary battery with each other by using a comparison circuit, thereby performing on-off control of a switch between the photovoltaic cell and the secondary battery. In addition, there has been a technology for controlling a switch disposed between a photovoltaic cell and a secondary battery, based on a result of a comparison between a potential difference between both terminals of a reverse-current preventing diode (a potential difference between both terminals of the switch) and a predetermined value, thereby preventing a reverse current from occurring, the comparison being made by using a comparison circuit, the reverse-current preventing diode being disposed in parallel with the switch.

However, in the technology for periodically comparing the generated voltage and the voltage of the secondary battery, even if the generated voltage is greater than the voltage of the secondary battery at comparison timings, there is a possibility that the switch remains turned on, thereby causing a reverse current, in a case where the generated voltage is reduced between the comparison timings. In addition, in a case of applying a photovoltaic cell to, for example, an Internet of Things (IoT) apparatus used in a room, a generated current becomes low. Therefore, in the technology for detecting a potential difference between both terminals of the switch, in a case where on-resistance of the switch is low, the potential difference becomes very small, and it is difficult to detect the potential difference by using the comparison circuit.

In this way, in the conventional technologies, there is a problem that it is difficult to suppress the occurrence of the reverse current.

The followings are reference documents.
[Document 1] Japanese Patent No. 3271992,
[Document 2] Japanese Laid-open Patent Publication No. 09-261861,
[Document 3] Japanese Laid-open Patent Publication No. 2000-347753, and
[Document 4] Japanese Laid-open Patent Publication No. 04-265639.

SUMMARY

According to an aspect of the invention, a charging circuit includes: a first energy harvesting element that performs energy harvesting and supplies a current to a power storage element; a second energy harvesting element that performs energy harvesting, the second energy harvesting element is made in materials same as the first energy harvesting element; and a first switch that is disposed in a current path between the first energy harvesting element and the power storage element and that is put into an off-state, in a case where a first output voltage of the second energy harvesting element is smaller than a first value, thereby cutting off the current path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments for implementing the present technology will be described with reference to drawings.

First Embodiment

Figure 1:
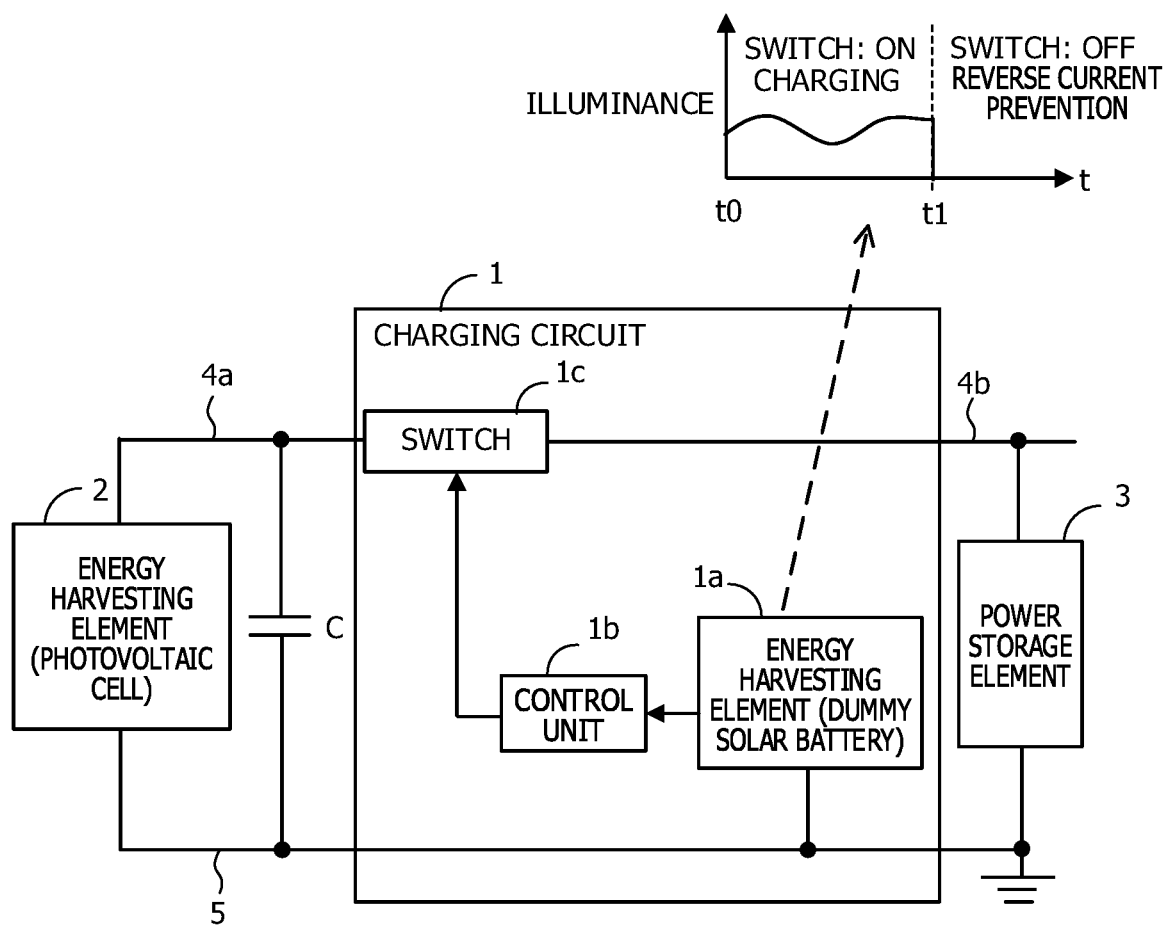
FIG. 1 is a diagram illustrating an example of a charging circuit of a first embodiment.

FIG. 1 is a diagram illustrating an example of a charging circuit of a first embodiment.

Based on a current generated by an energy harvesting element 2 connected between power supply lines 4a and 5, a charging circuit 1 charges a power storage element (for example, a secondary battery or a capacitor) 3 connected between a power supply line 4b and the power supply line 5. In addition, the charging circuit 1 has a function of preventing a reverse current, headed from the power storage element 3 to the energy harvesting element 2, from occurring.

The charging circuit 1 includes an energy harvesting element 1a, a control unit 1b, and a switch 1c.

The energy harvesting element 1a is connected to the control unit 1b and the power supply line 5 serving as a reference potential (for example, 0 V). The energy harvesting element 1a is created by the same material as that of the energy harvesting element 2 supplying a current to the power storage element 3 and performs energy harvesting. In the following description, it is assumed that the energy harvesting element 2 is a photovoltaic cell. Therefore, it is assumed that the energy harvesting element 1a is a photovoltaic cell. Note that since the energy harvesting element 1a supplies no current to the power storage element 3, the energy harvesting element 1a is represented as a dummy photovoltaic cell in FIG. 1.

In addition, it is desirable that the energy harvesting element 1a is arranged, under the same conditions as those of the energy harvesting element 2, at a place subjected to the same conditions as those thereof so as to reflect a power generation state of the energy harvesting element 2 more. The energy harvesting element 1a and the energy harvesting element 2 are arranged adjacent to each other and are arranged so that directions of light receiving surfaces of the two face the same direction, for example.

Note that each of the energy harvesting elements 2 and 1a may be a thermoelectric generation element to output a direct-current voltage, a vibration power generation element to output an alternating-current voltage, or the like. In this regard, however, in a case of using the vibration power generation element to output an alternating-current voltage, a converter (a rectifier or the like) to convert the alternating-current voltage into a direct-current voltage is used.

Based on an output voltage of the energy harvesting element 1a, the control unit 1b outputs a control signal for controlling the switch 1c. In a case where, during the night or the like, the illuminance of light is low and the output voltage of the energy harvesting element 1a is lower than a predetermined value (hereinafter, called a threshold value), the control unit 1b outputs a control signal for turning off the switch 1c, for example.

Note that the threshold value is a threshold voltage at which a metal-oxide semiconductor field effect transistor (MOSFET) included in the control unit 1b is put into an on-state, for example. As described later, the control unit 1b may be realized by a simple circuit such as an inverter circuit.

The switch 1c is disposed in a current path between the energy harvesting element 2 and the power storage element 3. In addition, in a case where the output voltage of the energy harvesting element 1a is lower than the threshold value, the switch 1c is put into an off-state by the control signal output by the control unit 1b and cuts off the above-mentioned current path. In addition, in a case where the output voltage of the energy harvesting element 1a is greater than or equal to the threshold value, the switch 1c is put into an on-state. In this case, based on a current generated by the energy harvesting element 2, the power storage element 3 is charged.

In the example of FIG. 1, one of two terminals of the switch 1c is connected to the energy harvesting element 2 via the power supply line 4a, and the other terminal of the switch 1c is connected to the power storage element 3 via the power supply line 4b. In a case where the switch 1c is in the on-state, an output voltage of the energy harvesting element 2 is applied to each of the power supply lines 4a and 4b.

Note that while, in the example of FIG. 1, a capacitor C for reducing noise is connected in parallel with the energy harvesting element 2 between the power supply lines 4a and 5, the capacitor C may be omitted.

Hereinafter, an example of an operation of the charging circuit 1 of the first embodiment will be described.

On an upper side of FIG. 1, an example of a relationship between a change in the illuminance and the operation of the charging circuit 1 is illustrated.

In a case where the illuminance is relatively high and the output voltage of the energy harvesting element 1a is greater than or equal to the threshold value (between timings t0 and t1), the control unit 1b outputs a control signal for turning on the switch 1c. Thus, the switch 1c is put into the on-state, and a current generated by the energy harvesting element 2 flows into the power storage element 3 via the power supply lines 4a and 4b, thereby charging the power storage element 3.

On the other hand, in a case where, during the night or the like, the illuminance is low and the output voltage of the energy harvesting element 1a is lower than the threshold value (on and after the timing t1), the control unit 1b outputs the control signal for turning off the switch 1c. Thus, the switch 1c is put into the off-state, and the current path between the energy harvesting element 2 and the power storage element 3 is cut off.

If the illuminance becomes low, there is a possibility that the output voltage of the energy harvesting element 2 becomes lower than a voltage of the power storage element 3. If, in this case, the switch 1c remains in the on-state, there is a possibility that a reverse current, headed from the power storage element 3 to the energy harvesting element 2, occurs. However, in the charging circuit 1 of the present embodiment, the energy harvesting element 1a is created by the same material as that of the energy harvesting element 2. Therefore, a characteristic of the output voltage of the charging circuit 1 is the same as a characteristic of the output voltage of the energy harvesting element 2. Accordingly, if the output voltage of the energy harvesting element 2 is reduced, the output voltage of the energy harvesting element 1a is reduced in the same way, and if the output voltage of the energy harvesting element 1a falls below the threshold value as described above, the switch 1c is put into the off-state. Thus, the occurrence of a reverse current is avoided, the back-flow being headed from the power storage element 3 to the energy harvesting element 2.

In this way, in the charging circuit 1, the switch 1c between the energy harvesting element 2 and the power storage element 3 is controlled based on the output voltage of the energy harvesting element 1a formed of the same material as that of the energy harvesting element 2, thereby enabling control of the switch 1c, in which the power generation state of the energy harvesting element 2 is correctly reflected in real time. Therefore, in a case of low illuminance (in a case of low environmental energy), it is possible to easily prevent a reverse current, headed from the power storage element 3 to the energy harvesting element 2, from occurring. Thus, it is possible to suppress the occurrence of a loss caused by a current flowing from the power storage element 3 into the energy harvesting element 2. In addition, a high-precision comparison circuit or the like does not have to be used, and it is possible to realize the charging circuit 1 by using a simple circuit. Therefore, a cost is suppressed.

In addition, since being used for controlling the switch 1c, the energy harvesting element 1a only has to output a relatively low output voltage. Therefore, as the energy harvesting element 1a, an element having a smaller element size than that of the energy harvesting element 2 is used. In a case where the energy harvesting element 2 is configured by, for example, photovoltaic cells, the energy harvesting element 1a is realized by one photovoltaic cell. Thus, it is possible to reduce a circuit area of the charging circuit 1.

Second Embodiment

Hereinafter, a charging circuit of a second embodiment will be described. Note that while, in what follows, the charging circuit of the second embodiment will be described by using photovoltaic cells similarly to the example of the respective energy harvesting elements 1a and 2 illustrated in FIG. 1, a dummy photovoltaic cell 10a and a photovoltaic cell 11 are not limited to the photovoltaic cells.

Figure 2:
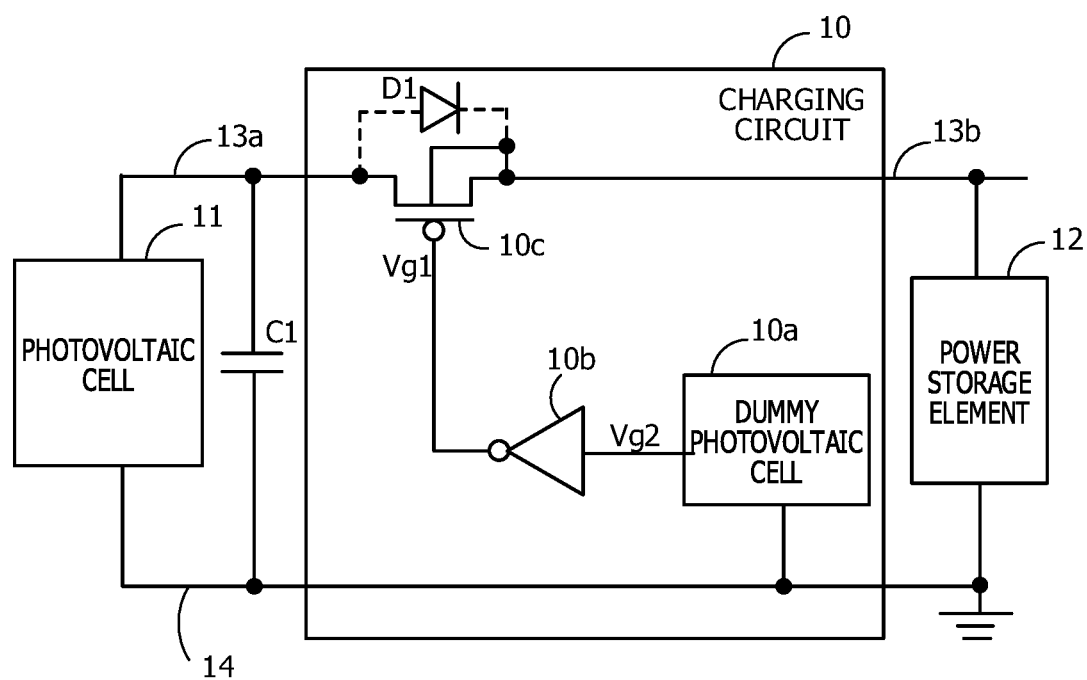
FIG. 2 is a diagram illustrating an example of a charging circuit of a second embodiment.

FIG. 2 is a diagram illustrating an example of the charging circuit of the second embodiment.

Based on a current generated by the photovoltaic cell 11 connected between power supply lines 13a and 14, a charging circuit 10 charges a power storage element 12 connected between a power supply line 13b and the power supply line 14. In addition, the charging circuit 10 has a function of preventing a reverse current, headed from the power storage element 12 to the photovoltaic cell 11, from occurring.

The charging circuit 10 includes the dummy photovoltaic cell 10a, an inverter circuit 10b, and a p-type MOSFET (hereinafter, abbreviated as a pMOS) 10c.

The dummy photovoltaic cell 10a is made of the same material as that of the photovoltaic cell 11 supplying a current to the power storage element 12 and performs solar power generation.

The dummy photovoltaic cell 10a is connected to an input terminal of the inverter circuit 10b and the power supply line 14 serving as a reference potential (for example, 0 V).

The inverter circuit 10b has the function of the control unit 1b in the charging circuit 1 of the first embodiment and outputs a control signal Vg1 obtained by inverting a logic level of an output voltage Vg2 of the dummy photovoltaic cell 10a. In a case where the output voltage Vg2 is lower than an inversion threshold value of the inverter circuit 10b (in a case where the logic level of the output voltage Vg2 is a low (L) level), the inverter circuit 10b outputs the control signal Vg1 having a logic level of a high (H) level, in order to put the pMOS 10c into an off-state. In addition, in a case where the output voltage Vg2 is greater than or equal to the inversion threshold value of the inverter circuit 10b (in a case where the logic level of the output voltage Vg2 is an H level), the inverter circuit 10b outputs the control signal Vg1 having a logic level of an L level, in order to put the pMOS 10c into an on-state.

The pMOS 10c has the function of the switch 1c in the charging circuit 1 of the first embodiment. In a case where the output voltage Vg2 is smaller than the inversion threshold value of the inverter circuit 10b, the pMOS 10c is put into the off-state, based on the control signal Vg1 output by the inverter circuit 10b, thereby cutting off a current path between the photovoltaic cell 11 and the power storage element 12. In addition, in a case where the output voltage Vg2 is greater than or equal to the inversion threshold value of the inverter circuit 10b, the pMOS 10c is put into the on-state, thereby charging the power storage element 12, based on the current generated by the photovoltaic cell 11.

As illustrated in FIG. 2, a gate of the pMOS 10c is connected to an output terminal of the inverter circuit 10b. In addition, one of a source and a drain of the pMOS 10c is connected to the photovoltaic cell 11 via the power supply line 13a, and the other of the source and the drain of the pMOS 10c is connected to the power storage element 12 via the power supply line 13b. In addition, a back gate of the pMOS 10c is connected to the power supply line 13b.

As illustrated in FIG. 2, with the pMOS 10c configured as such, a parasitic diode D1 having an anode connected to the power supply line 13a and having a cathode connected to the power supply line 13b is formed.

Note that in a case where the pMOS 10c is in the on-state, an output voltage of the photovoltaic cell 11 is applied to the power supply lines 13a and 13b.

In addition, note that while, in the example of FIG. 2, a capacitor C1 for reducing noise is connected in parallel with the photovoltaic cell 11 between the power supply lines 13a and 14, the capacitor C1 may be omitted.

The above-mentioned inverter circuit 10b may be realized by, for example, the following circuit.

Figure 3:
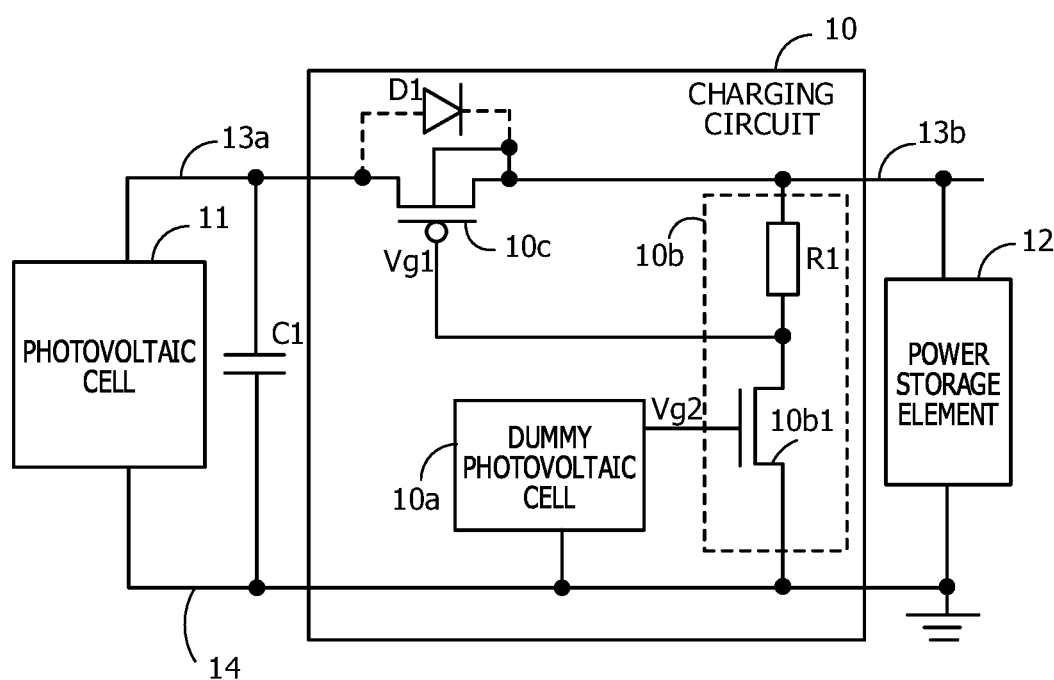
FIG. 3 is a diagram illustrating an example of an inverter circuit.

FIG. 3 is a diagram illustrating an example of an inverter circuit.

The inverter circuit 10b includes an n-type MOSFET (hereinafter, abbreviated as an nMOS) 10b1 and a resistance element R1.

A gate of the nMOS 10b1 is connected to the dummy photovoltaic cell 10a, and a drain thereof is connected to one of two terminals of the resistance element R1 and the gate of the pMOS 10c. A source of the nMOS 10b1 is connected to the power supply line 14. The other terminal of the resistance element R1 is connected to the power supply line 13b.

In the inverter circuit 10b configured as such, in a case where the output voltage Vg2 of the dummy photovoltaic cell 10a is lower than an threshold voltage (corresponding to the inversion threshold value of the inverter circuit 10b) at which the nMOS 10b1 is put into an on-state, the nMOS 10b1 is put into an off-state. If the nMOS 10b1 is put into the off-state, the resistance element R1 causes a gate voltage (the control signal Vg1) of the pMOS 10c to be roughly equal to the voltage of the power storage element 12. Accordingly, the pMOS 10c is put into the off-state.

On the other hand, in a case where the output voltage Vg2 of the dummy photovoltaic cell 10a is greater than or equal to the threshold voltage, the nMOS 10b1 is put into the on-state. If the nMOS 10b1 is put into the on-state, the logic level of the gate voltage of the pMOS 10c is decreased to an L level, and the pMOS 10c is put into the on-state.

Hereinafter, an example of an operation of the charging circuit 10 of the second embodiment will be described.

Figure 4:
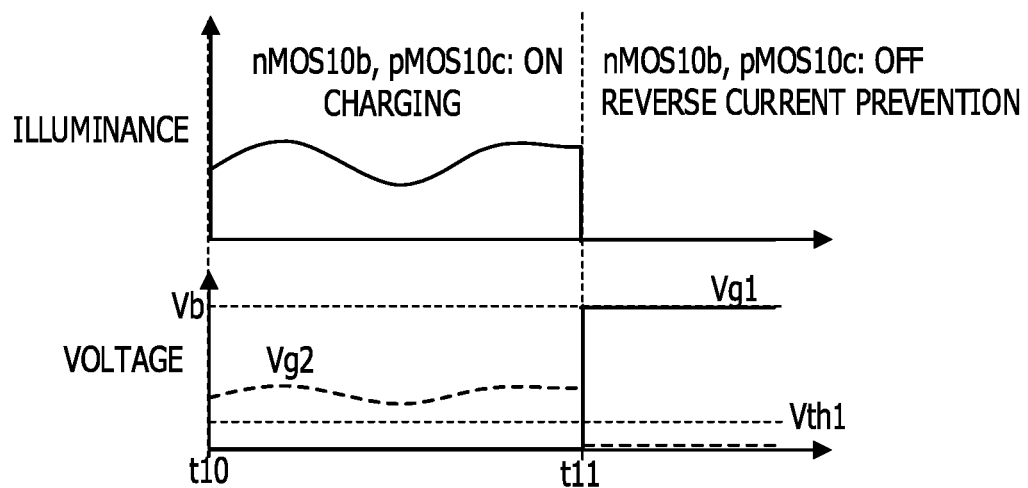
FIG. 4 is a timing chart illustrating an example of an operation of the charging circuit of the second embodiment.

FIG. 4 is a timing chart illustrating an example of an operation of the charging circuit of the second embodiment.

FIG. 4 illustrates examples of temporal changes in the illuminance, the control signal Vg1 (the gate voltage of the pMOS 10c), and the output voltage Vg2 of the dummy photovoltaic cell 10a (the gate voltage of the nMOS 10b1).

In a case where the illuminance is relatively high and the output voltage Vg2 of the dummy photovoltaic cell 10a is greater than or equal to a threshold voltage Vth1 at which the nMOS 10b1 is put into the on-state (between timings t10 and t11), the nMOS 10b1 is put into the on-state. Thus, the control signal Vg1 output by the inverter circuit 10b becomes nearly 0 V, and the pMOS 10c is put into the on-state. Therefore, the current generated by the photovoltaic cell 11 flows into the power storage element 12 via the power supply lines 13a and 13b, thereby charging the power storage element 12.

On the other hand, in a case where the illuminance is low and the output voltage Vg2 of the dummy photovoltaic cell 10a is lower than the threshold voltage Vth1 (on and after the timing t11), the nMOS 10b1 is put into the off-state. Thus, the control signal Vg1 output by the inverter circuit 10b becomes roughly equal to a voltage Vb of the power storage element 12, and the pMOS 10c is put into the off-state. Therefore, the current path between the photovoltaic cell 11 and the power storage element 12 is cut off.

As described above, in the charging circuit 10 of the second embodiment, in the same way as in the charging circuit 1 of the first embodiment, in a case of low illuminance (in a case of low generated electric power), by using a simple circuit, it is possible to easily prevent a reverse current, headed from the power storage element 12 to the photovoltaic cell 11, from occurring. Therefore, it is possible to suppress the occurrence of a loss caused by a current flowing from the power storage element 12 into the photovoltaic cell 11.

In addition, in a case where the pMOS 10c is in the off-state, even if the output voltage of the photovoltaic cell 11 is lower than the voltage of the power storage element 12, a reverse bias is applied to the parasitic diode D1. Therefore, it is possible to suppress the occurrence of a reverse current via the parasitic diode D1.

In addition, since, as illustrated in FIG. 3, being used for controlling the nMOS 10b1, the dummy photovoltaic cell 10a only has to output the relatively low output voltage Vg2. Therefore, as the dummy photovoltaic cell 10a, a cell having a smaller element size than that of the photovoltaic cell 11 is used. In a case where the photovoltaic cell 11 is configured by, for example, photovoltaic cells, the dummy photovoltaic cell 10a is realized by one photovoltaic cell. Thus, it is possible to reduce a circuit area of the charging circuit 10.

Third Embodiment

Figure 5:
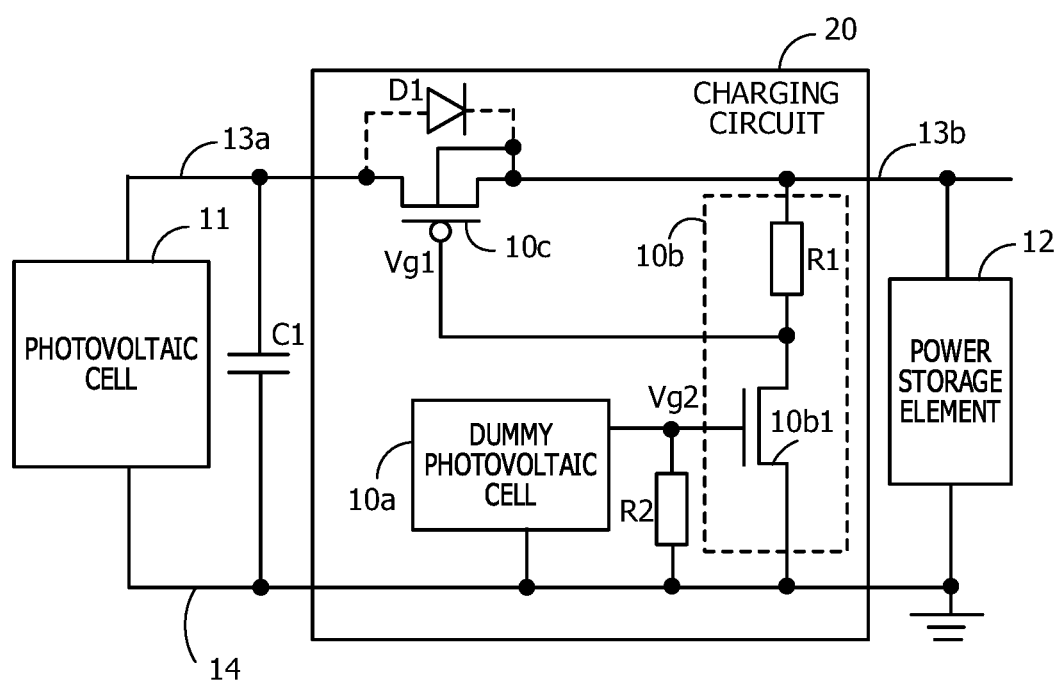
FIG. 5 is a diagram illustrating an example of a charging circuit of a third embodiment.

FIG. 5 is a diagram illustrating an example of a charging circuit of a third embodiment. In FIG. 5, the same reference numeral is assigned to the same element as an element illustrated in FIG. 3.

A charging circuit 20 of the third embodiment includes a resistance element R2 having one of two terminals, connected to the gate of the nMOS 10b1 of the inverter circuit 10b and the dummy photovoltaic cell 10a, and having the other terminal connected to the power supply line 14.

A resistance value of the resistance element R2 is set so that the output voltage Vg2 of the dummy photovoltaic cell 10a is lower than the threshold voltage at which the nMOS 10b1 is put into the on-state, in a case where environmental energy has a value at which a current flows back from the power storage element 12 to the photovoltaic cell 11.

In a case where the photovoltaic cell 11 is used as an energy harvesting element in such a manner as in the charging circuit 20 of the present embodiment, the environmental energy is, for example, the light.

Hereinafter, an example of design of the resistance value of the resistance element R2 will be indicated.

First, illuminance at which a reverse current, headed from the power storage element 12 to the photovoltaic cell 11, occurs is measured. In a case where the power storage element 12 is charged and the voltage of the power storage element 12 is, for example, 3 V, if illuminance is reduced and the output voltage of the photovoltaic cell 11 becomes lower than 3 V, a reverse current, headed from the power storage element 12 to the photovoltaic cell 11, occurs. The illuminance at this time is measured. In addition, the resistance value of the resistance element R2 is defined so that the output voltage Vg2 of the dummy photovoltaic cell 10a at the illuminance at this time becomes lower than the threshold voltage at which the nMOS 10b1 is put into the on-state.

In what follows, it is assumed that the threshold voltage is 0.3 V and the illuminance at which a reverse current occurs is lower than or equal to 40 Lux.

Figure 6:
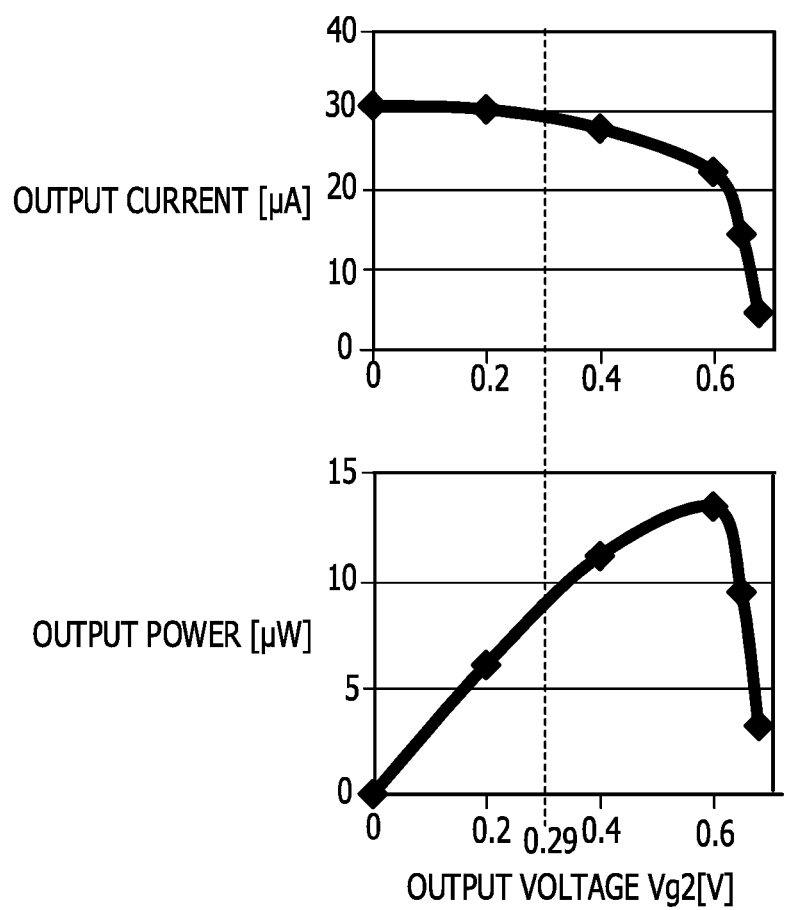
FIG. 6 is a diagram illustrating examples of power generation characteristics of a dummy photovoltaic cell.

FIG. 6 is a diagram illustrating examples of power generation characteristics of a dummy photovoltaic cell.

FIG. 6 illustrates a relationship between the output voltage Vg2 and an output current of the dummy photovoltaic cell 10a and a relationship between the output voltage Vg2 and output electric power, in a case of illuminance of 40 Lux. Vertical axes indicate the output current (in units of μA) and the output electric power (in units of μW), and horizontal axes each indicate the output voltage Vg2 (in units of V).

From the relationship between the output current and the output voltage Vg2 in FIG. 6, it is understood that in a case of the illuminance of, for example, 40 Lux, the resistance value of the resistance element R2 is desired to be set to about 100 kΩ in order that the output voltage Vg2 be 0.29 V lower than the threshold voltage of 0.3 V.

There is a possibility that production tolerances occur in the power generation characteristics of the photovoltaic cell 11 and the dummy photovoltaic cell 10a and the threshold voltage at which the nMOS 10b1 is put into the on-state. However, by disposing the resistance element R2 having the resistance value set as described above, the charging circuit 20 is more reliably able to suppress the occurrence of a reverse current.

Fourth Embodiment

Figure 7:
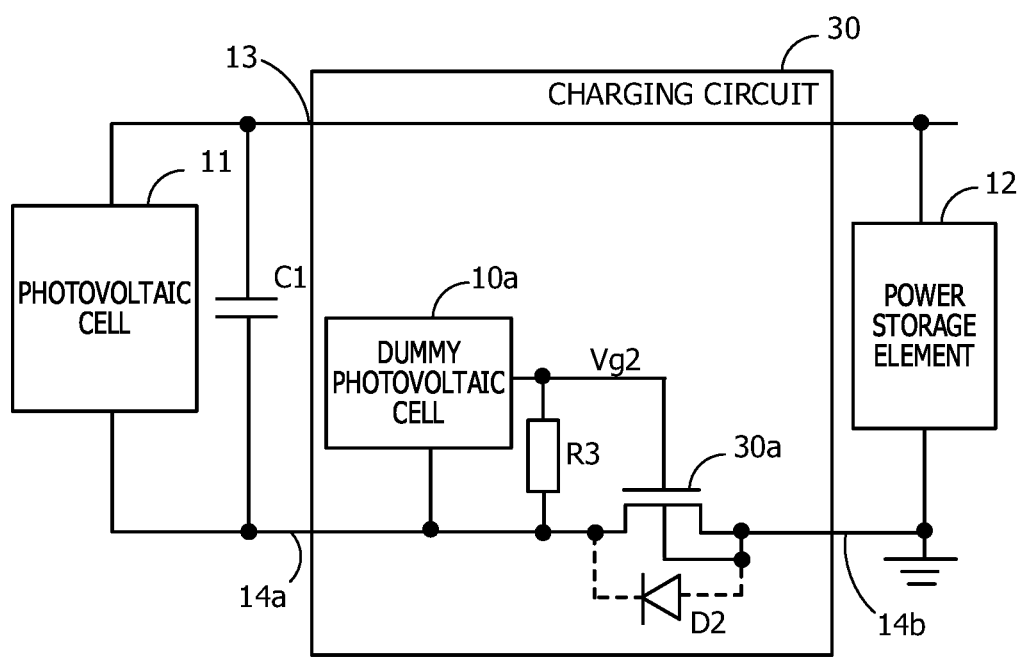
FIG. 7 is a diagram illustrating an example of a charging circuit of a fourth embodiment.

FIG. 7 is a diagram illustrating an example of a charging circuit of a fourth embodiment. In FIG. 7, the same reference numeral is assigned to the same element as an element illustrated in FIG. 2.

Unlike the charging circuit 10 of the second embodiment, a charging circuit 30 of the fourth embodiment includes an nMOS 30a as a switch, in place of the pMOS 10c. In addition, the charging circuit 30 includes a resistance element R3.

As illustrated in FIG. 7, a gate of the nMOS 30a is connected to the dummy photovoltaic cell 10a and one of two terminals of the resistance element R3. In addition, one of a source and a drain of the nMOS 30a is connected to the photovoltaic cell 11 via a power supply line 14a, and the other of the source and the drain of the nMOS 30a is connected to the power storage element 12 via a power supply line 14b. In addition, a back gate of the nMOS 30a is connected to the power supply line 14b.

As illustrated in FIG. 7, with the nMOS 30a configured as such, a parasitic diode D2 having an anode connected to the power supply line 14b and having a cathode connected to the power supply line 14a is formed.

Note that in a case where the nMOS 30a is in an on-state, the power supply lines 14a and 14b each serve as a reference potential. In addition, the output voltage of the photovoltaic cell 11 is applied to a power supply line 13 that electrically connects the photovoltaic cell 11 and the power storage element 12. The other terminal of the resistance element R3 is connected to the power supply line 14a.

The nMOS 30a is directly controlled by the output voltage Vg2 of the dummy photovoltaic cell 10a. In a case where the output voltage Vg2 is lower than a threshold voltage at which the nMOS 30a is put into the on-state, the nMOS 30a is put into an off-state and cuts off the current path between the photovoltaic cell 11 and the power storage element 12.

In addition, in a case where the output voltage Vg2 is greater than or equal to the above-mentioned threshold value, the nMOS 30a is put into the on-state. In this case, the current path between the photovoltaic cell 11 and the power storage element 12 is formed, and the power storage element 12 is charged based on the current generated by the photovoltaic cell 11.

In the same way as the resistance element R2 of the charging circuit 20 of the third embodiment, the resistance element R3 has the function of adjusting the output voltage Vg2 of the dummy photovoltaic cell 10a.

A resistance value of the resistance element R3 is set so that the output voltage Vg2 of the dummy photovoltaic cell 10a is lower than the threshold voltage at which the nMOS 30a is put into the on-state, in a case where environmental energy has a value at which a current flows back from the power storage element 12 to the photovoltaic cell 11.

In determining the resistance value of the resistance element R3, illuminance at which a reverse current, headed from the power storage element 12 to the photovoltaic cell 11, occurs is preliminarily measured first. In addition, the resistance value of the resistance element R3 is determined so that the output voltage Vg2 of the dummy photovoltaic cell 10a at the illuminance in this case becomes lower than the threshold voltage at which the nMOS 30a is put into the on-state.

Note that in a case where the nMOS 30a is able to be put into the off-state even without the resistance element R3 by the output voltage Vg2 of the dummy photovoltaic cell 10a at the occurrence of a reverse current, the resistance element R3 does not have to be disposed.

Hereinafter, an example of an operation of the charging circuit 30 of the fourth embodiment will be described.

Figure 8:
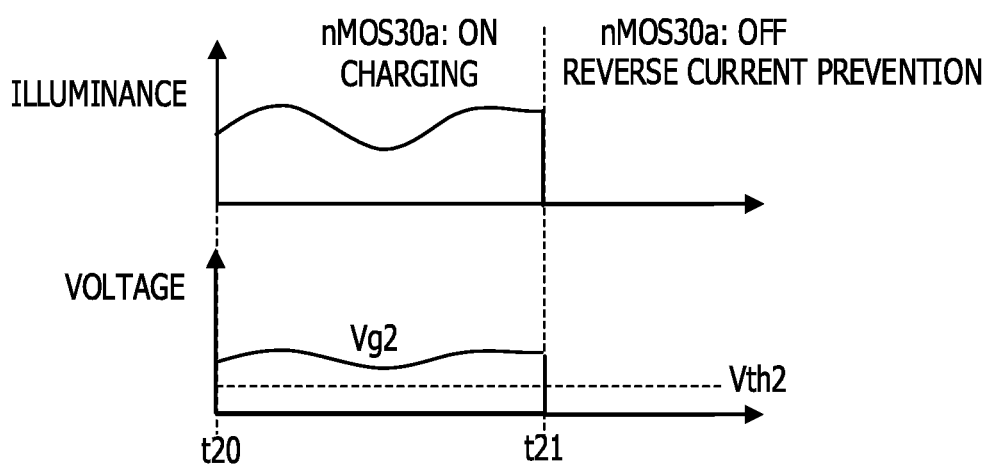
FIG. 8 is a timing chart illustrating an example of an operation of the charging circuit of the fourth embodiment.

FIG. 8 is a timing chart illustrating an example of an operation of the charging circuit of the fourth embodiment.

FIG. 8 illustrates examples of temporal changes in the illuminance and the output voltage Vg2 of the dummy photovoltaic cell 10a (the gate voltage of the nMOS 30a).

In a case where the illuminance is relatively high and the output voltage Vg2 of the dummy photovoltaic cell 10a is greater than or equal to a threshold voltage Vth2 at which the nMOS 30a is put into the on-state (between timings t20 and t21), the nMOS 30a is put into the on-state. Therefore, the current path is formed between the photovoltaic cell 11 and the power storage element 12, and the power storage element 12 is charged by the current generated by the photovoltaic cell 11.

On the other hand, in a case where the illuminance is low and the output voltage Vg2 of the dummy photovoltaic cell 10a is lower than the threshold voltage Vth2 (on and after the timing t21), the nMOS 30a is put into the off-state. Therefore, the power supply lines 14a and 14b are separated from each other, and the current path between the photovoltaic cell 11 and the power storage element 12 is cut off.

In the charging circuit 30 of the fourth embodiment as described above, the same advantage as that of the charging circuit 10 of the second embodiment or the charging circuit 20 of the third embodiment is obtained. Furthermore, in the charging circuit 30, the nMOS 30a is directly controlled by the output voltage Vg2 of the dummy photovoltaic cell 10a. Therefore, the inverter circuit 10b does not have to be used, and it is possible to cause the charging circuit 30 to have a simpler circuit configuration. Therefore, it is possible further to suppress a cost.

In addition, in a case where the nMOS 30a is in the off-state, even if the output voltage of the photovoltaic cell 11 is lower than the voltage of the power storage element 12, a reverse bias is applied to the parasitic diode D2. Therefore, it is possible to suppress the occurrence of a reverse current via the parasitic diode D2.

Fifth Embodiment

Figure 9:
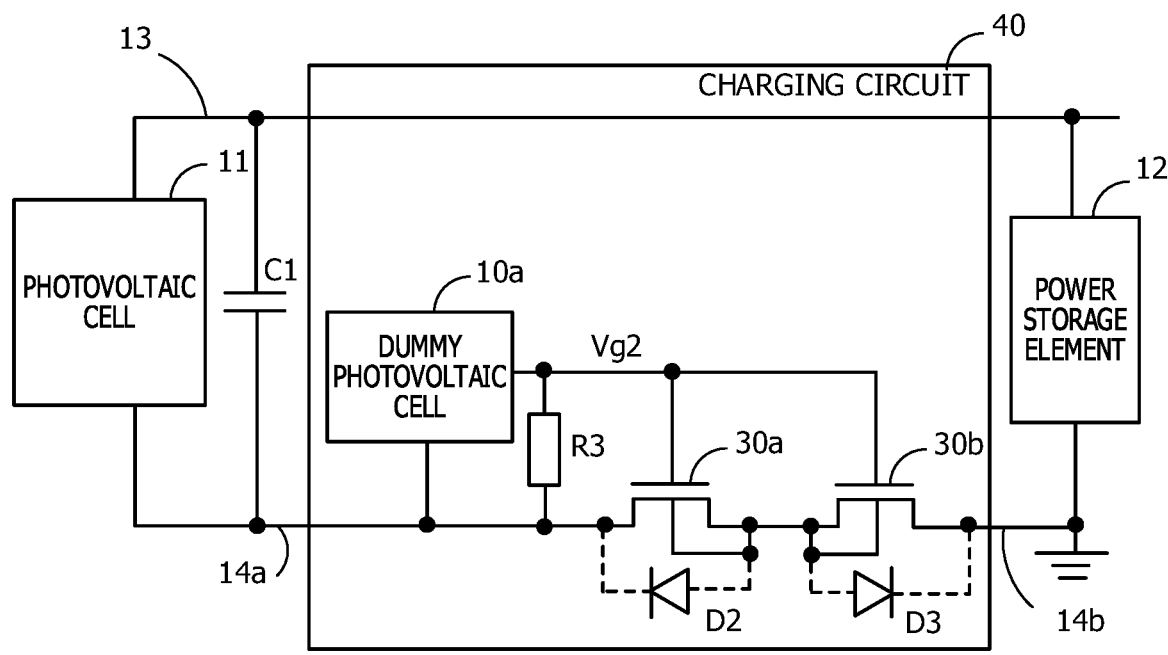
FIG. 9 is a diagram illustrating an example of a charging circuit of a fifth embodiment.

FIG. 9 is a diagram illustrating an example of a charging circuit of a fifth embodiment. In FIG. 9, the same reference numeral is assigned to the same element as an element illustrated in FIG. 7.

A charging circuit 40 of the fifth embodiment includes another switch (an nMOS 30b) that is connected in series with the nMOS 30a and that functions as a switch in the current path between the photovoltaic cell 11 and the power storage element 12.

A gate of the nMOS 30b is connected to the dummy photovoltaic cell 10a and one of two terminals of the resistance element R3, and in the same way as the nMOS 30a, the nMOS 30b is subjected to on-off control, based on the output voltage Vg2 of the dummy photovoltaic cell 10a.

In addition, one of a source and a drain of the nMOS 30b is connected to one of the source and the drain of the nMOS 30a, and the other of the source and the drain of the nMOS 30b is connected to the power storage element 12 via the power supply line 14b. Furthermore, a connection direction of a back gate of the nMOS 30b is different from that of the back gate of the nMOS 30a. The back gate of the nMOS 30b is connected to the other of the source or the drain of the nMOS 30b. Therefore, the back gate of the nMOS 30a and the back gate of the nMOS 30b are electrically connected to each other.

As illustrated in FIG. 9, with the nMOS 30b configured as such, a parasitic diode D3 having a direction opposite to that of the parasitic diode D2 of the nMOS 30a is formed.

The charging circuit 40 as described above has the same advantage as that of the charging circuit 30 of the fourth embodiment. Furthermore, in the charging circuit 40, by forming the parasitic diodes D2 and D3, it is possible to inhibit a current from bi-directionally flowing between the photovoltaic cell 11 and the power storage element 12 in a case where the nMOSs 30a and 30b are in the respective off-states.

Note that the charging circuits 10 and 20 of the second and third embodiments, respectively, may each have a pMOS that is subjected to on-off control by the control signal Vg1, that is connected in series with the pMOS 10c, and in which a back gate of the pMOS is connected so that a parasitic diode having a direction opposite to that of the parasitic diode D1 is formed.

Sixth Embodiment

Figure 10:
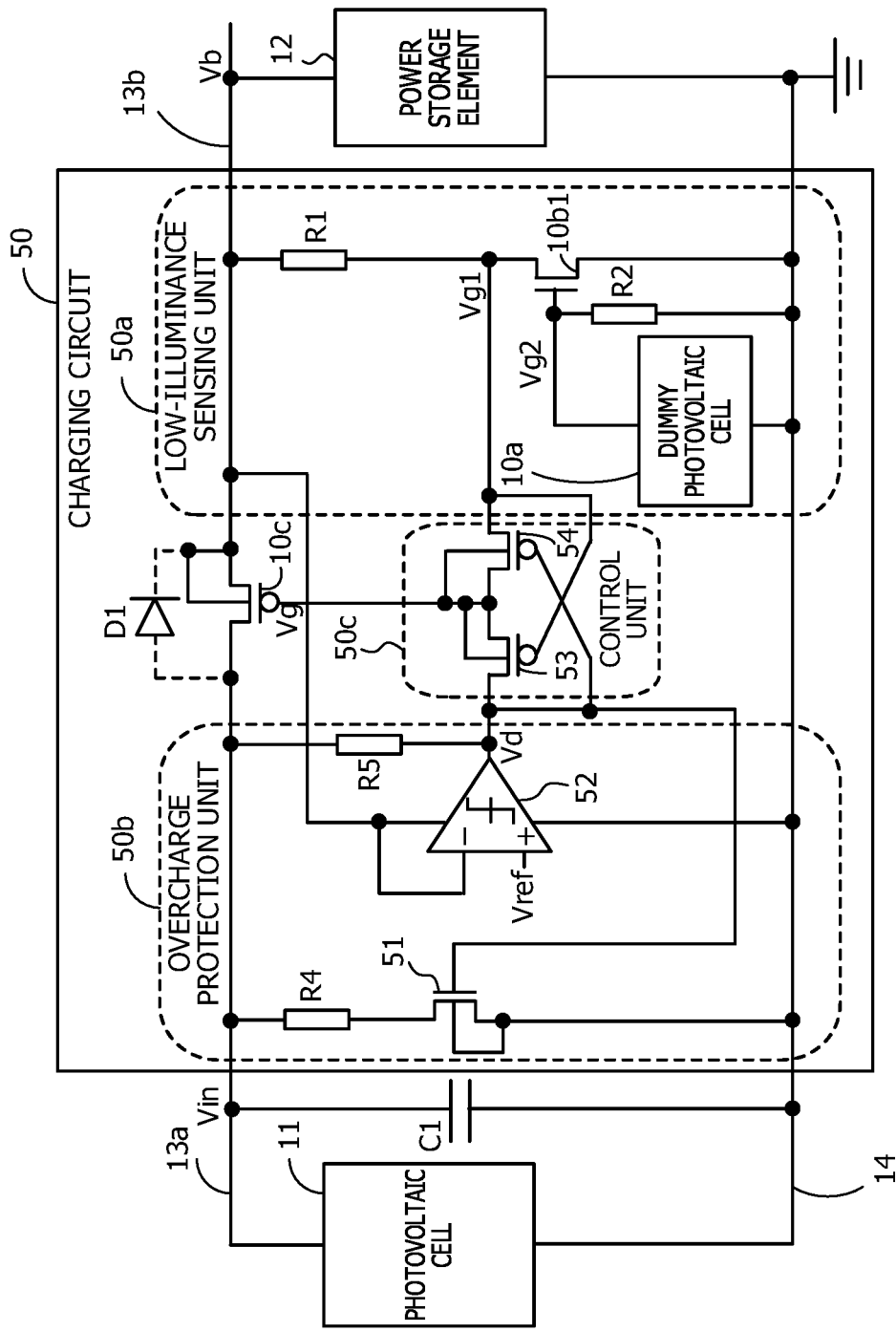
FIG. 10 is a diagram illustrating an example of a charging circuit of a sixth embodiment.

FIG. 10 is a diagram illustrating an example of a charging circuit of a sixth embodiment. In FIG. 10, the same reference numeral is assigned to the same element as an element illustrated in FIG. 5.

A charging circuit 50 includes a low-illuminance sensing unit 50a, an overcharge protection unit 50b, a control unit 50c, and the pMOS 10c.

In the same way as the charging circuit 20 of the third embodiment illustrated in FIG. 5, the low-illuminance sensing unit 50a includes the dummy photovoltaic cell 10a, the nMOS 10b1, and the resistance elements R1 and R2. If illuminance is reduced and the output voltage Vg2 of the dummy photovoltaic cell 10a becomes lower than the threshold voltage at which the nMOS 10b1 is put into the on-state, the low-illuminance sensing unit 50a outputs the control signal Vg1 having the logic level of an H level. In a case where the output voltage Vg2 is greater than or equal to the threshold voltage, the low-illuminance sensing unit 50a outputs the control signal Vg1 having the logic level of an L level.

The overcharge protection unit 50b is a circuit for avoiding overcharge of the power storage element 12. The overcharge protection unit 50b includes an nMOS 51, a comparison circuit 52, and resistance elements R4 and R5.

A drain of the nMOS 51 is connected to the power supply line 13a via the resistance element R4, and a source of the nMOS 51 is connected to the power supply line 14 and a back gate of the nMOS 51 itself. An output signal Vd of the comparison circuit 52 is supplied to a gate of the nMOS 51.

If the voltage Vb of the power storage element 12 is greater than a voltage Vref, the comparison circuit 52 outputs the output signal Vd having the logic level of an H level, and if the voltage Vb is lower than the voltage Vref, the comparison circuit 52 outputs the output signal Vd having the logic level of an L level.

The voltage Vref is determined based on, for example, an upper limit value of an operation voltage of the power storage element 12. In a case where the power storage element 12 is a secondary battery and a range of the operation voltage thereof is, for example, 2.8 V to 3.1 V, the voltage Vref is set to, for example, 3.1 V or the like. Note that the voltage Vref may be generated by using a voltage of a primary battery not illustrated, may be generated by using an output voltage Vin of the photovoltaic cell 11, or may be generated by using the voltage Vb of the power storage element 12, for example.

The comparison circuit 52 is connected between the power supply lines 13b and 14 and operates by using, as a power-supply voltage, a voltage between the power supply lines 13b and 14. An inverting input terminal (represented as "−") of the comparison circuit 52 is connected to the power supply line 13b, and the voltage Vref is applied to a non-inverting input terminal (represented as "+") of the comparison circuit 52. An output terminal of the comparison circuit 52 is connected to the gate of the nMOS 51 and is further connected to the power supply line 13a via the resistance element R5. Furthermore, the output terminal of the comparison circuit 52 is connected to the control unit 50c.

Based on the control signal Vg1 output by the low-illuminance sensing unit 50a and the output signal Vd of the comparison circuit 52 in the overcharge protection unit 50b, the control unit 50c outputs a control signal Vg, thereby subjecting the pMOS 10c to on-off control.

The control unit 50c includes pMOSs 53 and 54. The output signal Vd is supplied to one of a source and a drain of the pMOS 53 and a gate of the pMOS 54, and the control signal Vg1 is supplied to one of a source and a drain of the pMOS 54 and a gate of the pMOS 53. In addition, the other of the source and the drain of the pMOS 53 and the other of the source and the drain of the pMOS 54 are connected to each other and are connected to back gates of the respective pMOSs 53 and 54 and the gate of the pMOS 10c.

Hereinafter, an example of an operation of the charging circuit 50 of the sixth embodiment will be described.

Figure 11:
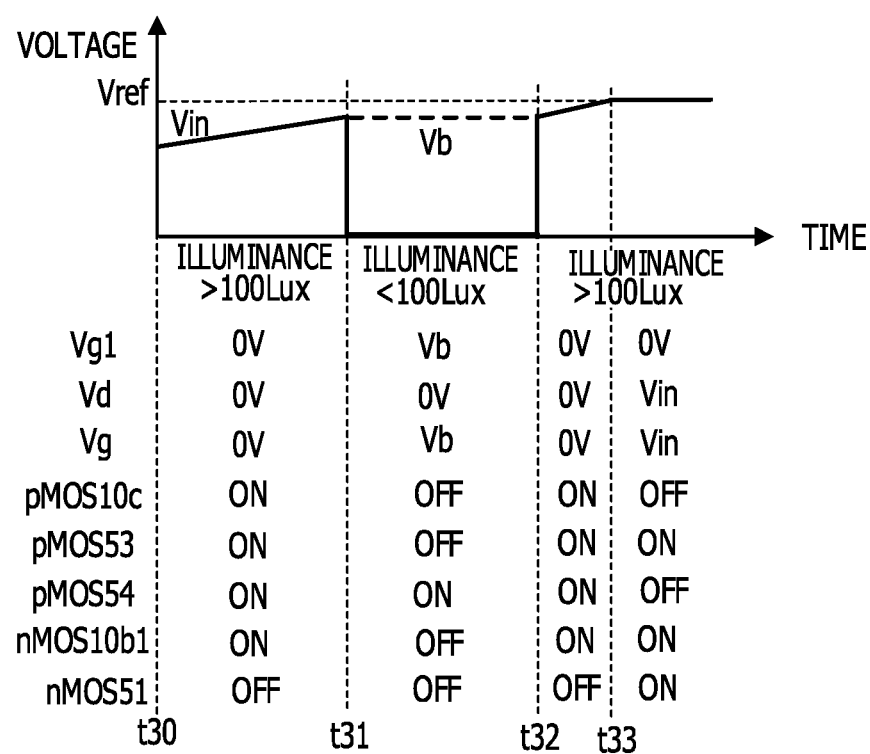
FIG. 11 is a timing chart illustrating an example of an operation of the charging circuit of the sixth embodiment.

FIG. 11 is a timing chart illustrating an example of an operation of the charging circuit of the sixth embodiment. FIG. 11 illustrates situations of changes in the output voltage Vin of the photovoltaic cell 11 and the voltage Vb of the power storage element 12 in a case where illuminance changes. In addition, FIG. 11 illustrates changes in the control signals Vg1 and Vg and the output signal Vd and changes in states of the pMOSs 10c, 53, and 54 and the nMOSs 10b1 and 51.

Note that, in the description of FIG. 11, it is assumed that the resistance value of the resistance element R2 is set so as to put the pMOS 10c into the off-state in order to prevent a reverse current from occurring in a case where the illuminance falls below 100 Lux.

If the photovoltaic cell 11 is exposed to light, the output voltage Vin increases. In a case where the illuminance is greater than 100 Lux (between timings t30 and t31), the nMOS 10b1 is in the on-state. Therefore, the control signal Vg1 becomes 0 V (corresponding to a logic level that reaches an L level). This causes the pMOS 53 to be put into the on-state. In addition, the voltage Vb of the power storage element 12 in this case is smaller than the voltage Vref. Therefore, the output signal Vd of the comparison circuit 52 becomes 0 V. Therefore, the nMOS 51 is put into the off-state, and the pMOS 54 is put into the on-state. In addition, in a case where the nMOS 10b1 and the pMOSs 53 and 54 are in the respective on-states, the control signal Vg becomes 0 V. Therefore, the pMOS 10c is put into the on-state.

In a case where the illuminance is less than 100 Lux (between timings t31 and t32), the output voltage Vin declines (becomes 0 V in FIG. 11), and the output voltage Vg2 of the dummy photovoltaic cell 10a becomes smaller than the threshold voltage at which the nMOS 10b1 is put into the on-state. Therefore, the nMOS 10b1 is put into the off-state, and the control signal Vg1 becomes the voltage Vb (corresponding to a logic level that reaches an H level). Thus, the pMOS 53 is put into the off-state. In addition, since the voltage Vb of the power storage element 12 in this case is smaller than the voltage Vref, the output signal Vd of the comparison circuit 52 remains at 0 V. Therefore, the nMOS 51 maintains the off-state, and the pMOS 54 maintains the on-state. In addition, in a case where the nMOS 10b1 and the pMOS 53 are in the respective off-states and the pMOS 54 in the on-state, the control signal Vg becomes the voltage Vb. Therefore, the pMOS 10c is put into the off-state.

Thus, the current path between the photovoltaic cell 11 and the power storage element 12 is cut off, and the occurrence of a reverse current is suppressed.

If the illuminance becomes greater than 100 Lux again (at a timing t32), the output voltage Vin increases, and the voltage Vb increases. However, in a case where the voltage Vb is smaller than the voltage Vref, the voltages of the respective control signals Vg1 and Vg and output signal Vd and the states of the respective MOSFETs are the same as those between the timings t30 and t31.

In a case where the output voltage Vin and voltage Vb further increase and the voltage Vb exceeds the voltage Vref, the output signal Vd of the comparison circuit 52 becomes a voltage equal to the output voltage Vin. Therefore, the nMOS 51 is put into the on-state, and the pMOS 54 is put into the off-state. Since the pMOS 53 maintains the on-state, the control signal Vg becomes a voltage equal to the output voltage Vin, and the pMOS 10c is put into the off-state.

Thus, the current path between the photovoltaic cell 11 and the power storage element 12 is cut off, and it is possible to suppress overcharge of the power storage element 12.

In the charging circuit 50 as described above, the same advantage as that of the charging circuit 20 of the third embodiment is obtained. In a case where amorphous silicon photovoltaic cells are used as the dummy photovoltaic cell 10a and the photovoltaic cell 11 and a coin-type lithium secondary battery is used as the power storage element 12, a generated current of the photovoltaic cell 11 is about 50 µA when the illuminance is at 200 Lux, for example. In a case where the low-illuminance sensing unit 50a is not disposed, a current of about 40 µA flows back from the power storage element 12 to the photovoltaic cell 11 when the illuminance is at 0 Lux, and a loss occurs. In contrast, by disposing the low-illuminance sensing unit 50a as described above and controlling the pMOS 10c, the reverse current is suppressed to about 0.1 µA.

Furthermore, in the charging circuit 50 of the sixth embodiment, it is possible to avoid overcharge of the power storage element 12. In addition, it is possible to use a switch (the pMOS 10c) to be put into an off-state in avoiding a reverse current, as a switch to be put into an off-state in avoiding overcharge. Therefore, it is possible to suppress an increase in the circuit area of the charging circuit 20 having the functions of preventing a reverse current and avoiding overcharge and a loss caused by on-resistance of a switch.

Note that circuit configurations of the overcharge protection unit 50b and the control unit 50c as described above may be arbitrarily changed and may be added to the charging circuit 30 as illustrated in FIG. 7, and the nMOS 30a may be put into the off-state at a time of the occurrence of overcharge.

Electronic Device

Figure 12:
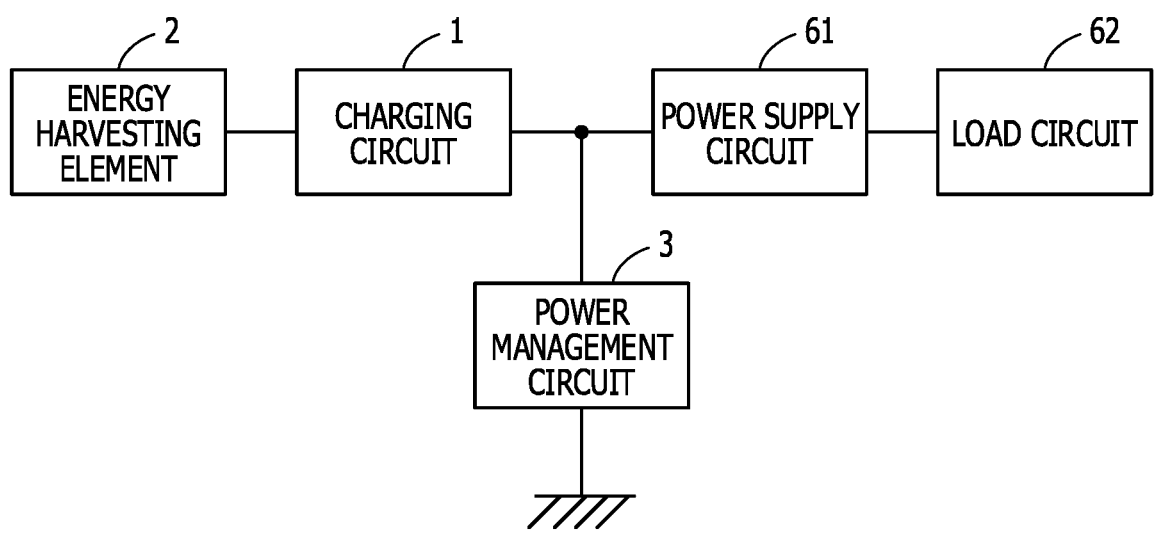
FIG. 12 is a diagram illustrating an example of an electronic device.

FIG. 12 is a diagram illustrating an example of an electronic device. In FIG. 12, the same reference numeral is assigned to the same element as an element illustrated in FIG. 1.

An electronic device 60 is, for example, a sensing terminal and includes a power management circuit 61 and a load circuit 62 in addition to the charging circuit 1, the energy harvesting element 2, and the power storage element 3.

The power management circuit 61 includes, for example, a direct current (DC)-to-DC converter and converts the voltage of the power storage element 3 into a voltage suitable for an operation of the load circuit 62. Note that if the load circuit 62 is operable at the voltage of the power storage element 3, the power management circuit 61 may be omitted.

The load circuit 62 operates based on the voltage of the power storage element 3. The load circuit 62 is, for example, a sensor, a wireless module, or the like. Note that various electronic circuits and electronic devices and so forth may be applied to the load circuit 62.

By using, in the above-described electronic device 60, the charging circuit 1 illustrated in FIG. 1, it is possible to easily prevent a reverse current, headed from the power storage element 3 to the energy harvesting element 2, from occurring in a case of low environmental energy. Therefore, it is possible to suppress the occurrence of a loss caused by a current flowing from the power storage element 3 into the energy harvesting element 2. Thus, it is possible to inhibit power supply to the load circuit 62 from becoming unstable. In addition, a high-precision comparison circuit or the like does not have to be used, and it is possible to realize the charging circuit 1 by a simple circuit. Therefore, a cost of the electronic device 60 is suppressed.

Note that it goes without saying that any one of the charging circuits 10, 20, 30, 40, and 50 of the second to sixth embodiment, respectively, may be used as the charging circuit 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A charging circuit comprising:
   a first energy harvesting element that performs energy harvesting and supplies a current to a power storage element;
   a second energy harvesting element that performs energy harvesting, the second energy harvesting element is made in materials same as the first energy harvesting element; and
   a first switch that is disposed in a current path between the first energy harvesting element and the power storage element and that is put into an off-state, in a case where a first output voltage of the second energy harvesting element is smaller than a first value, thereby cutting off the current path.

2. The charging circuit according to claim 1, wherein the second energy harvesting element has an element size smaller than that of the first energy harvesting element.

3. The charging circuit according to claim 1, further comprising
   an inverter circuit that inverts a logic level of the first output voltage of the second energy harvesting element, wherein
   the first switch is connected to a first power supply line to which a second output voltage of the first energy harvesting element is applied, the first switch being a p-type transistor to be put into an on-state or the off-state in response to a logic level of an output signal of the inverter circuit, and
   the first value is an inversion threshold value of the inverter circuit.

4. The charging circuit according to claim 1, wherein
   the first switch is connected to a second power supply line to serve as a reference potential and is an n-type transistor to be put into an on-state or the off-state by the first output voltage, and
   the first value is a threshold voltage at which the n-type transistor is put into the on-state.

5. The charging circuit according to claim 1, further comprising
   a resistance element, a resistance value of which is set so that the first output voltage becomes smaller than the first value in a case where environmental energy has a value at which a current flows back from the power storage element to the first energy harvesting element.

6. The charging circuit according to claim 1, further comprising
   a second switch that is connected to the current path in series with the first switch serving as a MOSFET, that is subjected to on-off control based on the first output voltage, and that is the same conductivity type transistor as the first switch, wherein one of a first source or a first drain of the first switch is connected to the first energy harvesting element, one of a second source or a second drain of the second switch is connected to the power storage element, and the other of the first source or the first drain and the other of the second source or the second drain are connected to each other and are connected to a first back gate of the first switch and a second back gate of the second switch.

7. The charging circuit according to claim 1, further comprising:

a comparison circuit that compares a voltage of the power storage element and a second value with each other and that outputs a comparison result; and a control unit that turns off the first switch in a case where the comparison result indicates that the voltage is greater than the second value.

8. An electronic device comprising:

a power storage element;

a first energy harvesting element that performs energy harvesting and supplies a current to a power storage element;

a second energy harvesting element that performs energy harvesting, the second energy harvesting element is made in materials same as the first energy harvesting element;

a first switch that is disposed in a current path between the first energy harvesting element and the power storage element and that is put into an off-state, in a case where a first output voltage of the second energy harvesting element is smaller than a first value, thereby cutting off the current path; and a load circuit that operates based on a voltage of the power storage element.

* * * * *